Jan. 2, 1934.  B. C. TWICHELL  1,941,518
ART PICTURE
Filed Aug. 14, 1931
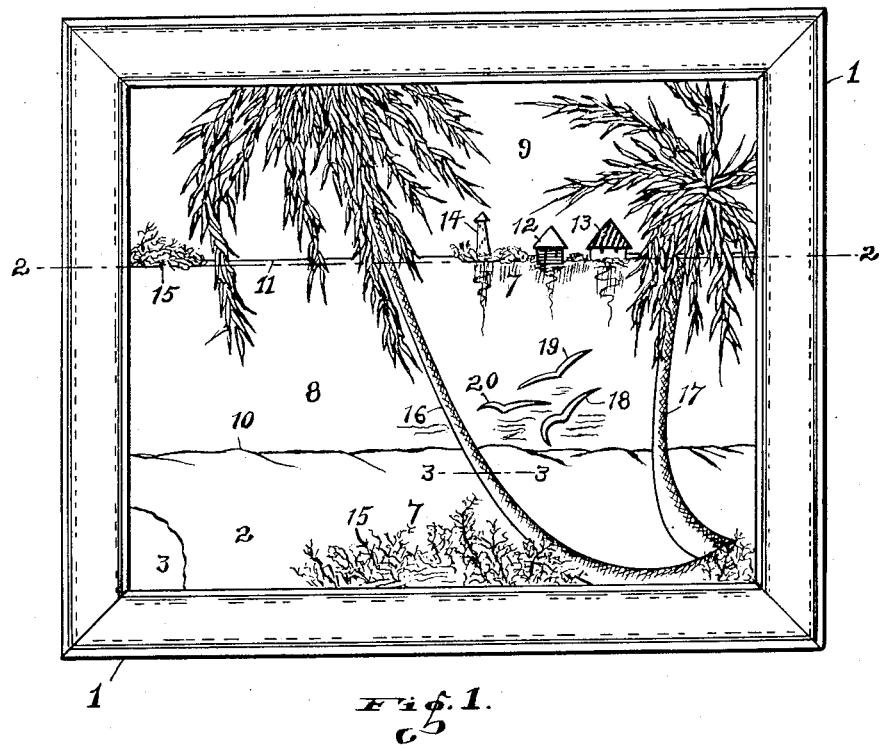
Fig. 1.
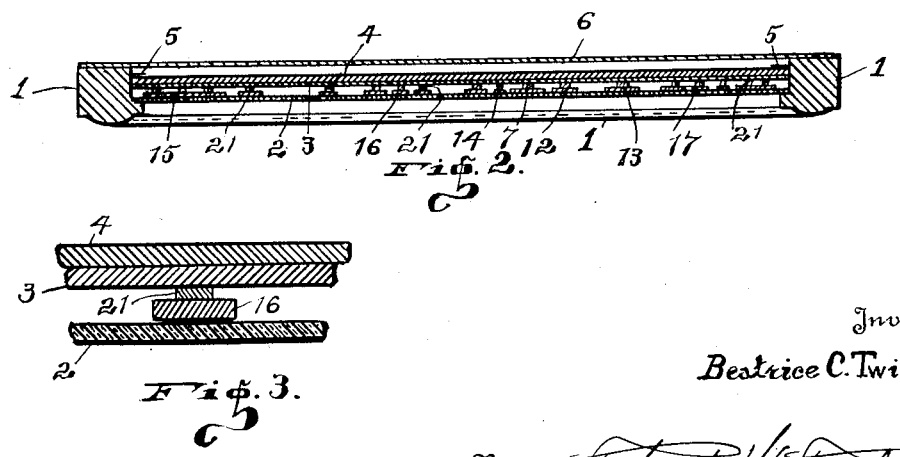
Fig. 2.
Fig. 3.
Inventor:
Beatrice C. Twichell;
By Robert W. Caudle,
Attorney.

Patented Jan. 2, 1934

1,941,518

UNITED STATES PATENT OFFICE 1,941,518

ART PICTURE

Beatrice C. Twichell, Miami, Fla.

Application August 14, 1931. Serial No. 557,137

1 Claim. (Cl. 41—34)

The primal object of my invention, broadly stated, is the production of new, unique, and ornamental works of art, which are pleasing to one's eyes and appealing to one's sense of artistry, and which are significant of a particular locality.

More particularly stated, my object is the production of individualistic hand-drawn artistic pictures, combining in their assembly the production of hand drawn objects in artificial colors which provide the background, with other features associated therewith formed from natural products by treating, cutting, and assembling, and retained in their natural colors or tints, and formulated to assume the appearance of certain familiar objects which are peculiar to that locality, the same to be associated with and to stand out from the hand-drawn background as a cameo; the whole forming a composite work of art.

And, finally, my object is the production of works of art which can be produced and assembled with a minimum of time and expense devoted thereto, whereby they may be sold at a comparatively low price, and which will bring out a maximum of artistic beauty.

Other special objects and particular features of my invention will be brought out in the source of the following description, and that which is new will be correlated in the appended claim.

In the accompanying drawing, forming a part of this specification, Figure 1 is a face view of an example of my invention complete.

Figure 2 is a cross section, as taken on the line 2—2 of Fig. 1. And Figure 3 is a detail cross section, on a greatly enlarged scale, as taken on the line 3—3 of Fig. 1.

Similar indices designate like parts throughout the three views shown in the drawing.

In order that the formation and the manner of making my invention may be fully understood and appreciated, I will now take up a detailed description thereof, in which I will set forth the same as fully and as comprehensively as I may.

My invention comprises a scenic background, usually painted in artificial colors to give an artistic and natural color effect to the appearance thereof; then providing details or other scenic representations, as buildings, boats, trees, shrubbery, animals, or other features, superimposed upon and secured to said background, and standing outwardly therefrom in the nature of a cameo.

Said superimposed details are usually formed from natural products such as sea-weeds, moss, sand, fish, beetles, grass, banana leaves, coconut fibre and fronds, lichens, barks, and, in fine, all or any appropriate varieties of plants, insects, animal and inanimate materials. However all of said materials are first treated, pressed, and dried, and some of them are entirely changed into the nature of a fibre and then cut to the shape desired. Said details are, preferably, formed of natural and untreated materials cut to have the appearance of the full size object from which they are formed.

And further I permanently secure the details in their respective positions upon the background, to form an artistic ensemble.

In the drawing numeral 1 denotes a frame, in which is fitted the transparency or glass 2. Numeral 3 denotes a sheet of cardboard, on the face of which the background or picture is painted.

Numeral 4 denotes the cardboard backing for the member 3.

The members 2, 3 and 4 are secured in the frame by means of sprigs 5, or otherwise. And numeral 6 denotes a sheet of art paper which is pasted over the back of the member 4, and it extends out onto the back of the frame 1, to protect the artistic features of the ensemble from dust, insects, et cet.

An example of one of my productions is shown in the drawing, but I am not to be limited to the particular design as shown, as there will be innumerable variations thereof in carrying out the practice of my invention.

Painted upon the card 3 is a background comprising, in this example, a portion of land 7, a body of water 8, and a section of sky 9. Said parts being painted with significant colors, and their limits are shown by the lines 10 and 11, in conjunction with the inner periphery of the frame 1.

The superimposed features of the picture comprise the representations of buildings 12 and 13, the light-house 14, the shrubbery 15, the trees 16 and 17, and the birds 18, 19 and 20, all of which are formed from natural products usually in their natural colors.

Said natural features are secured in fixed positions on the painting, or background, above described, by means of adhesive material 21, preferably pure chicle gum, as it answers every requirement for that purpose without any of the objectionable features found to all other adhesives which I have tried.

The method of procedure consists in painting upon the card 3, in artificial colors, the scenic representations desired. Next preparing the natural features and securing them in position on the painting, by means of adhesive material 21 or simply by the contact of the transparency 2 therewith. Next taking the frame 1, placing the transparency 2 therein. Next placing the assembled scenery which is contained on the card 3, in the frame 1, whereby it will be visible through the transparency 2, that is with the superimposed members next to the transparency whereby they will be visible therethrough. I next insert the backing 4, and secure the members 2, 3 and 4 rigidly in compact form in the frame, whereby they will be pressed together, and finally covering the back of the assembled parts with the protective material 6.

It is to be understood that the expression "natural colors" means not only the color bestowed by nature, but also colors or tints which may be added thereto to make the part appear as in its natural color, or colors.

Various other changes or variations may be made without departing from the spirit of my invention.

Having now fully shown and described the preferred means for carrying out the principles of my invention, what I claim, and desire to secure by Letters Patent of the United States, is—

An art picture comprising, in combination, a scenic painting in colors forming a background, natural appearing objects formed in miniature with relation to the respective objects which they represent, and formed manually in miniature from their respective natural materials in their natural colors superimposed upon said background, means for retaining the natural appearing objects upon the background, and means for enclosing all of said parts in displaying condition, all substantially as shown and described.

BEATRICE C. TWICHELL.